United States Patent [19]
Viviano et al.

[11] Patent Number: 5,756,137
[45] Date of Patent: May 26, 1998

[54] METHOD FOR PREPARING A BAKED DOUGH FOOD PRODUCT

[75] Inventors: Robert Viviano, Plymouth; Susan Lee Ambrozy, St. Clair Shores, both of Mich.

[73] Assignee: Little Caesar Enterprise, Inc., Detroit, Mich.

[21] Appl. No.: 577,380

[22] Filed: Dec. 22, 1995

[51] Int. Cl.⁶ ............................................. A21D 13/00
[52] U.S. Cl. ...................... 426/94; 426/92; 426/138; 426/275; 426/496; 426/549
[58] Field of Search .................... 426/94, 92, 102, 426/138, 274, 275, 283, 549, 496, 502

[56] References Cited

U.S. PATENT DOCUMENTS

| | | |
|---|---|---|
| 110,341 | 7/1870 | Carter et al. . |
| 234,233 | 2/1880 | Silvestri . |
| 1,174,826 | 3/1916 | Chapman . |
| 2,668,117 | 2/1954 | Bucci . |
| 3,026,822 | 3/1962 | Gatti . |
| 3,615,678 | 10/1971 | Tangel et al. . |
| 3,615,679 | 10/1971 | Tangel et al. . |
| 3,667,963 | 6/1972 | Katter et al. . |
| 3,753,733 | 8/1973 | Bell . |
| 3,892,868 | 7/1975 | Klingler . |
| 4,020,184 | 4/1977 | Chesner . |
| 4,066,796 | 1/1978 | McKee . |
| 4,112,127 | 9/1978 | Popeil . |
| 4,159,349 | 6/1979 | Caiello . |
| 4,170,659 | 10/1979 | Totino et al. . |
| 4,283,431 | 8/1981 | Giordano et al. . |
| 4,293,572 | 10/1981 | Silva et al. . |
| 4,400,404 | 8/1983 | Persi . |
| 4,401,681 | 8/1983 | Dahle . |
| 4,576,646 | 3/1986 | Branco et al. . |
| 4,645,674 | 2/1987 | Lang et al. . |
| 4,661,361 | 4/1987 | Mongiello et al. . |
| 4,938,975 | 7/1990 | Waller ..................... 426/94 |
| 5,185,167 | 2/1993 | Schwartz ................. 426/94 |
| 5,202,138 | 4/1993 | Stypula . |
| 5,256,432 | 10/1993 | McDonald et al. . |
| 5,405,627 | 4/1995 | Ito . |

FOREIGN PATENT DOCUMENTS

| | | |
|---|---|---|
| 1092887 | 1/1981 | Canada . |
| 1102612 | 6/1981 | Canada . |
| 1201921 | 3/1986 | Canada . |
| 65458 | 2/1990 | Canada . |
| 69547 | 11/1991 | Canada . |
| 70417 | 4/1992 | Canada . |
| 2096021 | 5/1992 | Canada . |
| 2069782 | 12/1992 | Canada . |

*Primary Examiner*—Lien Tran

[57] ABSTRACT

In the method for forming a dough food product a layer of dough is disposed upon a surface. A filling ingredient is disposed upon a first region of the layer of dough. A second region of the layer of dough is folded over the first region to cover the filling ingredient and form a pocket enclosing the filling ingredient. The pocket has an external folded edge formed by the folded layer of dough and a plurality of unsealed external edges. Seals are formed around the filling ingredient by sealingly joining the first and second regions along the external unsealed edges. The maximum fat content of the filling ingredient is selected in order to substantially eliminate breaking of the seals. The pocket can include a plurality of filling ingredient servings that can be individually sealed to form a plurality of subpockets.

10 Claims, 3 Drawing Sheets

METHOD FOR PREPARING A BAKED DOUGH FOOD PRODUCT

BACKGROUND OF THE INVENTION

1. Field of the Invention

This invention relates to the field of food products and methods for preparing food products, and, in particular, to the field of baked filled dough based food products.

2. Background Art

Many different kinds of dough based food products are known in the prior art. A variety of filling ingredients for the dough food products, such as mushrooms, tomato sauce, cheese and the like, are also known. For example, U.S. Pat. No. 4,400,404, issued to persi, teaches a dough food product formed from a rectangularly shaped layer of dough and provided with a filling ingredient centrally disposed along its longitudinal direction. A longitudinal portion of the rectangularly shaped layer of dough is folded over the filling ingredient to bring the two longitudinal edges of the layer into abutment with each other. The open edges around the filling ingredient are sealed and the transverse ends of the folded dough are brought together in a circular end-to-end fashion. The product is then baked.

It is also known to provide dough based food products with filling ingredients in their interiors such as filled doughnuts and the like. In order to prepare these food products, a filling ingredient is pumped into the interior portion of the dough. This manner of inserting the filling ingredient helps to protect against the problem of filling ingredients being expelled from the dough product during the baking process.

It is also known to enclose filling ingredients, for example pepperoni, in a dough product by positioning one layer of dough on a flat surface, placing a filling ingredient on top of the layer, and positioning a second layer of dough over the first. A seal is formed around the filling ingredients, for example by applying pressure to force the layers of dough against each other in order to join them to each other. The sealing pressure can be applied to the dough with fingers or with a sealing tool. The seals formed around the filling ingredients in the foregoing manner, however, are subject to breach, either during the baking process or thereafter. Food products having seals that are breached are not suitable for sale to customers. Therefore, it is desirable to minimize, if not eliminate, the number of breached seals around the filling ingredients when making food products of this type.

One of the most widely known dough based food product is the pizza pie. Pizza pies are formed in a generally flat, circular or rectangular shell covered with a sauce and usually covered with at least one topping ingredient. Normally, the dough of pizza pies is a bread dough, the sauce is a tomato sauce, and the topping ingredients can be cheese, pepperoni, anchovies and the like. The pizza pie is then baked in an oven, cut and served as individual food product servings.

U.S. Pat. No. 4,661,361, issued to Mongiello, also teaches a dough based food product. The dough based food product taught by Mongiello is directed to a pizza having a plurality of closed pockets for enclosing filling ingredients such as pepperoni and anchovies. In the product taught by Mongiello a plurality of portions of the filling ingredient is distributed about a dough base, spaced inwardly from an outer perimeter of the dough base. The filling ingredients are covered to form the plurality of pockets by folding an outside peripheral strip of the dough inwardly over them leaving an uncovered and unfilled dough base interior of the filled closed pockets. The unfilled dough base and filled pockets are baked while still joined to each other.

U.S. Pat. No. 3,026,822, issued to Gatti, teaches an apparatus for making a dough product, such as ravioli, having a filling. The apparatus taught by Gatti includes two hingedly connected boards. One board has a plurality of openings extending in a row along its upper surface, the other board has a flat upper surface. A layer of dough is placed over the two boards and quantities of filling ingredients are placed upon the layer of dough over the board openings. The upper surface of the layer of dough is moistened so that regions of the dough stick to each other when brought into contact with each other. In order to form the dough product, the dough on the flat board is folded over the quantities of filling ingredients using the hinge connecting the boards.

U.S. Pat. No. 4,367,243, issued to Brummett, teaches a precooked dough product in a container which controls the shape of the food product and the moisture loss during a final cooking process. In addition, a high solid content, preheated sauce and a high fat, thinly sliced cheese are used in order to accelerate the final cooking process. High solid content is enhanced by using a thick sauce. The low water content of the thick sauce increases the cooking rate because it causes the food product to have a lower thermal capacity. Brummett teaches that the improved results provided by use of a high fat cheese are due to the improved melting characteristics of the high fat cheese.

Briefly, the method of the present invention includes forming a baked dough based food product containing a serving of at least one type of filling ingredient. The dough based food product of the present invention completely encloses the filling ingredient. In a preferred embodiment, a layer of dough is disposed upon a work surface. At least one serving or, optionally, a plurality of spaced apart servings, of the filling ingredient is placed upon a region of the layer of dough. Another region of the layer of dough is folded over the serving or servings of the filling ingredient to cover the filling ingredient. The upper and lower layers of dough form a pocket, or, in the case of plural servings, the filling ingredient can be contained in one continuous pocket, as in stuffed crust pizza, or individual subpockets, enclosing each serving of filling ingredient to mass produce food individually filled food products. Pressure can be gently applied to the upper layer of dough, for example, in the vicinity of the filling ingredient, in order to force air from the pocket(s) or subpockets formed in this manner.

The pocket or subpockets enclosing the serving(s) of filling ingredient has one edge formed of a folded layer of dough and another edge comprising a seal formed by pressing the upper and lower layers of dough together. In the case of plural servings of the filling ingredient, the servings are arranged along the fold line of the pocket in order to provide each serving with an edge formed from the fold. This lowers the number of seals that must be formed by the application of sealing pressure. This is advantageous because the labor required to make the food product is therefore reduced and the fold is less subject to breaches or the leaking of the filling(s) from the pocket(s) during baking than are the areas requiring the formation of seals between the upper and lower layers. In the case of plural servings of filling ingredients, the sealed areas between the servings are cut in order to separate the servings of the food products from each other. Any type of filling ingredient can be enclosed in this manner. However, when fat and/or water-containing filling ingredients are used the fat and/or water content must be controlled in order to prevent the resultant liquids produced during the baking process from weakening the seals and causing a breach in the seals around the filling ingredient.

SUMMARY OF THE INVENTION

A dough based food product and a method for its preparation are provided wherein the food product includes a filling ingredient with a liquid content therein and a seal, subject to seal breach, for maintaining the filling ingredient within the food product, whereby the food product is made in a manner to substantially eliminate seal breaches. The filling ingredient is disposed upon a first region of the layer of dough. A second region of the layer of dough is folded over the first region to form a pocket enclosing the filling ingredient. The pocket has an external folded edge formed by the folded layer of dough and an unsealed external edge. A seal is formed around the serving of filling ingredient by sealingly joining the layers of dough along the external unsealed edge. The baked dough food product thus includes a filling ingredient and a dough enclosure sealing the filling ingredient therein. The dough enclosure has a folded edge and a sealed edge. The filling ingredient has a liquid content selected to permit baking of the food product within a predetermined amount of time while substantially eliminating breaches of the seal.

BRIEF DESCRIPTION OF THE DRAWINGS

In order that the manner in which the above recited and other advantages and objects of the invention are obtained can be appreciated, a more particular description of the invention briefly described above is rendered by reference to a specific embodiment thereof which is demonstrated in the appended drawings. Understanding that these drawings depict only a typical embodiment of the invention, and are therefore not to be considered limiting of its scope, the invention and the presently understood best mode thereof are described and explained with additional specificity in detail through the use of the accompanying drawings.

DETAILED DESCRIPTION OF THE INVENTION

Figure 1:
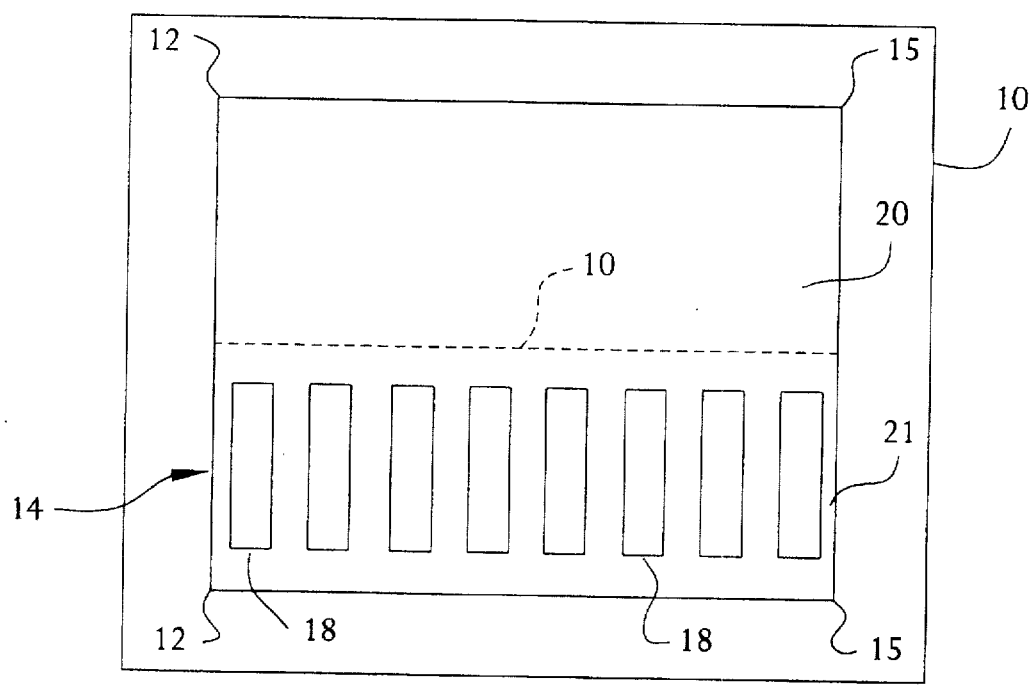
FIG. 1 shows a step in the method of the present invention for preparing multiple servings of a dough food product containing individual servings of a filling ingredient, wherein a layer of dough is disposed upon a work surface and the filling ingredient is disposed upon a region of the layer of dough.
Figure 2:
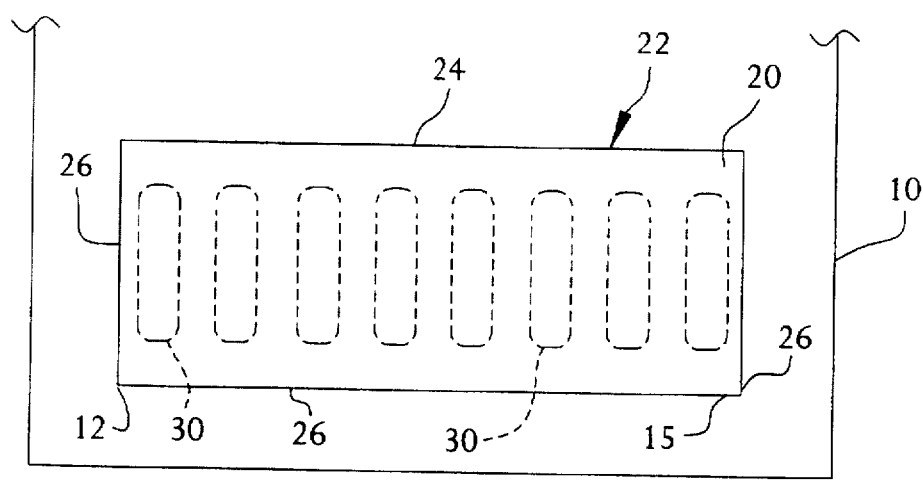
FIG. 2 shows a step in the food preparation method of FIG. 1 wherein a region of the layer of dough is folded to cover the servings of filling ingredient.
Figure 3:
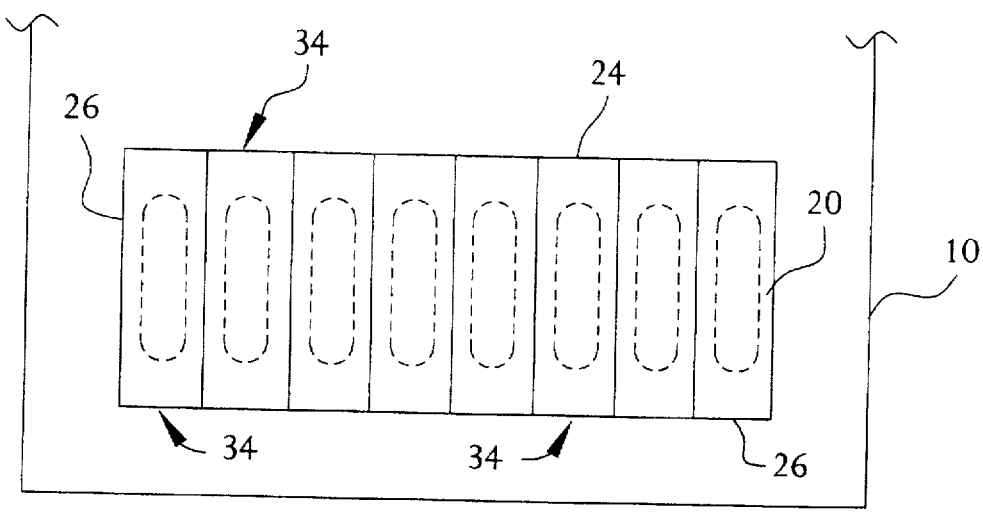
FIG. 3 shows a step in the food preparation method of FIG. 1 wherein individual food product servings are formed by cutting the food product.

Referring now to FIGS. 1–3, there is shown the method for preparing the baked dough food product of the present invention. In the method of the present invention, enclosing dough layer 14 is placed upon a work surface 10. Enclosing dough layer 14 includes upper region 20 and lower region 21, separated by midline 16. Although enclosing dough layer 14 is shown shaped as a rectangle, it can be a square, a circle or any other convenient shape. Enclosing dough layer 14 can be formed by inserting a flattened dough ball into a conventional sheeter to further flatten the dough ball into a sheet. If necessary, the resulting sheet can be cut and stretched after passing through the sheeter in order to provide the desired shape. Prior to placing enclosing dough layer 14 upon work surface 10, a heavy coating of, for example, cornmeal can be disposed upon work surface 10 in order to prevent enclosing dough layer 14 from sticking to work surface 10 when practicing the food preparation method of the present invention.

At least one serving of filling ingredients 18 is placed upon lower region 21 of enclosing dough layer 14 spaced from the edges of dough layer 14 and from midline 16. Preferably, the serving of filling ingredients 18 is spaced about one-quarter of an inch from the edges of dough layer 14 and from midline 16. When a plurality of servings of filling ingredients 18 is used the individual servings are placed in a spaced apart relationship with respect to each other. Preferably, in the case of plural servings of filling ingredients 18 the servings are all arranged along midline 16 of enclosing dough layer 14 approximately evenly spaced apart from each other and spaced one-quarter of an inch from the edges of dough layer 14 and from midline 16. Work surface 10 can be a specially designed board having indentations to serve as guides in the placement of filling ingredients 18. For example, the work surface 10 can be a molded plastic that has received FDA approval.

Enclosing dough layer 14 is then folded along midline 16 in order to dispose upper region 20 of dough layer 14 over lower region 21 and over filling ingredients 18. Midline 16 thus serves as a fold line causing corners 12 of dough layer 14 to be aligned with each other and corners 15 to be aligned with each other. This forms pocket 22 from enclosing dough layer 14, wherein pocket 22 substantially encloses filling ingredients 18. pocket 22 has folded external edge 24 formed when dough layer 14 is folded along midline 16. Pocket 22 also has unsealed external edges 26.

When a plurality of servings of filling ingredients 18 is provided, a plurality of subpockets 30 can be formed in pocket 22. Subpockets 30, each containing an individual serving of filling ingredients 18 are indicated in the drawings with a dotted line where upper region 20 drapes over filling ingredients 18. Upper region 20 can then be gently pressed, for example in the vicinity of filling ingredients 18, in order to remove any air trapped around filling ingredients 18 between regions 20, 21 of dough layer 14. Preferably, the pressure applied to remove the air is applied first near folded external edge 24 and then along filling ingredients 18 toward unsealed external edge 26 opposing folded external edge 24.

Seals are then formed around each serving of filling ingredients 18 by sealingly pressing upper region 20 against lower region 21 therebelow in the areas between filling ingredient servings 18. This causes regions 20, 21 of dough layer 14 to sealingly join together in the areas where the pressure is applied. Sealing pressure is also applied to upper region 20 along unsealed external edges 26 to form sealed external edges 26. It is not necessary to seal the area of pocket 22 along folded external edge 24 by applying sealing pressure in the method of the present invention because the fold in dough layer 14 along midline 16 creates a strong seal along this side of pocket 22. Food preparation time is thus saved because a separate sealing step along edge 24 is eliminated. The sealing pressure applied around filling ingredients 18 can be applied manually using fingers or the side of a hand, with a sealing tool or using any other method effective to join regions 20, 21 to each other.

Dough layer 14, now formed as pocket 22, can be cut and separated into a plurality of individual food product servings 34. Food product servings 34 can be formed by cutting pocket 22 beginning at folded external edge 24, along the sealed areas between subpockets 30, to sealed external edge 26 that opposes folded external edge 24. Care should be taken to cut along the center of the area between subpockets 30 in order to provide the best seal for the adjacent food product servings 34. Each food product serving 34 formed in this manner has a seal along its folded external edge 24 that is more difficult to breach than the seals along external edges 26.

Food product servings 34 are then permitted to proof. In the preferred embodiment of the invention, the proofing period can be a minimum of about thirty minutes to a maximum of about two hours. During the proofing period food product servings 34 are brought to room temperature. Food product servings 34 are then baked.

The constituent foods that form the servings of filling ingredients 18 generally are liquid containing foods, and more particularly, fat-containing and/or moisture containing foods. The fat-containing foods can include cheese, pepperoni, ground beef, chicken, sausage and the like. The predominantly moisture-containing foods can include green peppers, mushrooms, onions, olives and the like. It will be understood that the fat-containing foods also contain a substantial amount of moisture. Furthermore, it will be understood that as the fat content of the fat-containing foods is decreased, the moisture content increases. This results from the fact that in order to make the same volume of fat-containing filling ingredients 18, more water is added when less fat is added.

When filling ingredients 18 are baked, the fat within them melts into a flowing liquid. Furthermore, the moisture within filling ingredients 18 can flow from the filling ingredients 18 and can turn into steam during the baking process. The liquid fat and the moisture from filling ingredients 18 can cause the seals around filling ingredients 18 to be breached, thereby allowing filling ingredients 18 to escape and damaging food product servings 34. It is believed that the liquid fat and the moisture released from filling ingredients 18 in this manner cause breaches in the seals around filling ingredients 18 by weakening the dough forming them. Thus, when discussing the cause of broken seals in food products such as food products 34, it will be understood that both the fat and the moisture can be referred to as liquid.

Additionally, steam is formed from the moisture within subpockets 30 during baking. The steam formed in this manner can weaken the dough and increase the number of seal breaches. Additionally, the pressure of the steam can breach the seals by forcing regions 20, 21 of dough layer 14 to separate from each other. The seal breach problem is greater, in general, at higher baking temperatures than at lower temperatures. Therefore, one way to avoid seal breaches is to bake food product servings 34 at lower temperatures for longer periods of time.

Figure 4:
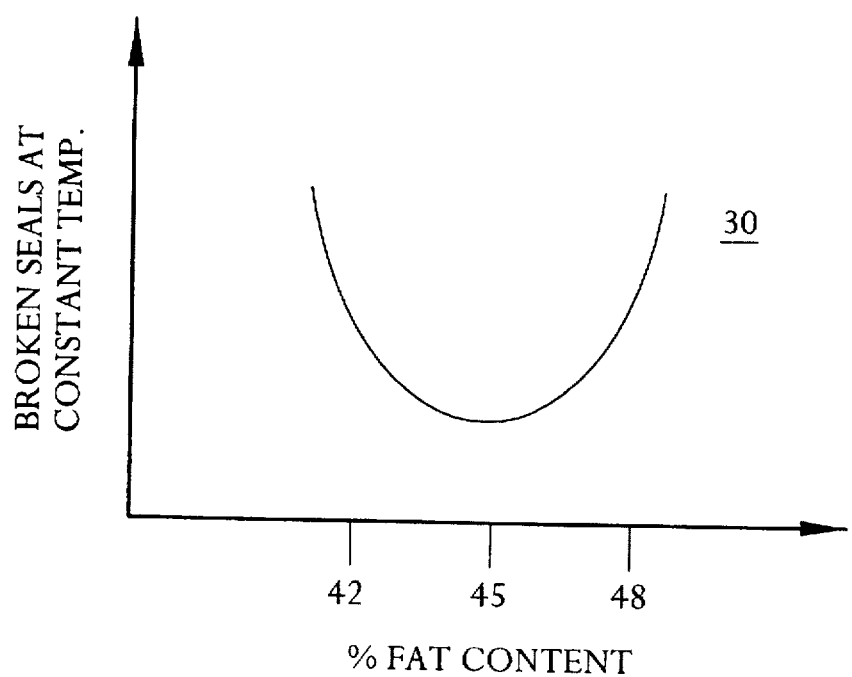
FIG. 4 shows a graphical representation of the relationship between the percentage fat content of a filling ingredient and the number of seals on the food product servings breached during the baking process at a constant temperature.
Figure 5:
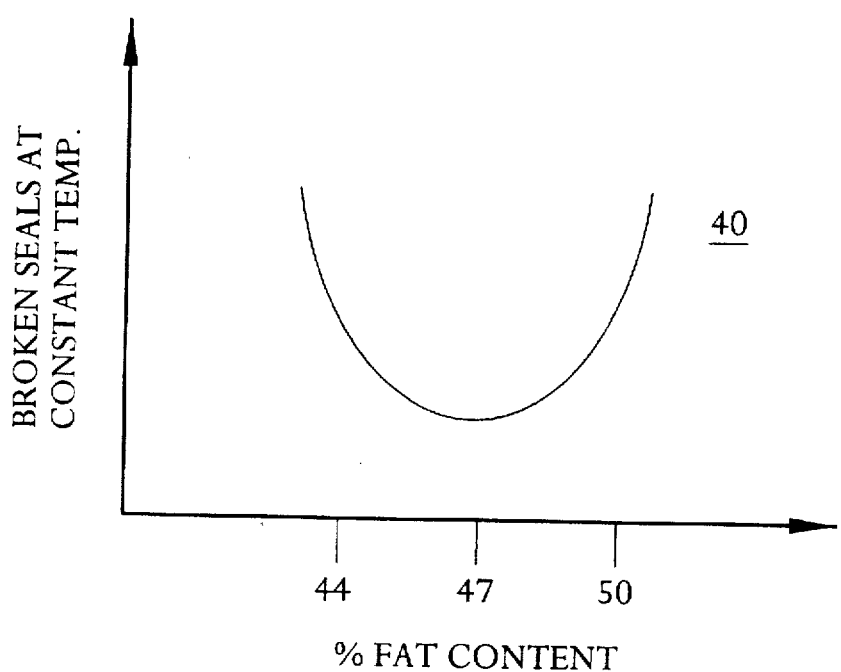
FIG. 5 shows a graphical representation of the relationship between the fat content of a further filling ingredient and the number of seals on the food product servings breached during the baking process at a constant temperature.

Referring now to FIGS. 4, 5, there are shown graphical representations 30, 40. Graphical representations 30, 40 illustrate the relationship between the percentage fat content of selected filling ingredients 18 and the incidence of seals on food product servings 34 that are breached when baked at a constant temperature of 600° F. Using the relationships of graphical representations 30, 40 an optimum value of fat content of filling ingredients can be selected to minimize the number of breached seals on food product servings 34.

While it is believed that the regulation of liquid (fat and/or moisture) content of filling ingredients 18 is the predominant factor in minimizing seal breaches, it will be understood that other factors can affect the incidence of seal breaches in food product servings 34. For example, varying the formulation of dough layer 14, applying food starch to dough layer 14 to help. Regions 20, 21 to stick to each other or varying the sealing pressure applied when forming the seals of food product 34, can affect the incidence of seal breaches. These additional factors affecting the seals of food product servings 34 can be used to vary the effect of fat and moisture content of filling ingredients 18 upon seal breaches. Therefore, these factors should be considered when determining the relationships of graphical representations 30, 40 in order to assure that the results obtained accurately indicate the effects of fat and moisture content.

It is preferred that no seals on food products servings 34 be breached either during the baking process or after the baking process before they are consumed. However, since this is not possible, the incidence of breached seals that can be tolerated is determined according to economic and esthetic considerations. Food product servings 34 having a breached seal are normally not sold to customers for aesthetic reasons and are therefore normally discarded. Therefore, economic considerations dictate that the incidence of breached seals, and thus the number of discarded food product servings 34, be substantially eliminated if not completely eliminated. In order to do this the liquid content of the various filling ingredients in the present invention is selected to substantially eliminate the breached seals when food product servings 34 are baked at a temperature required to complete the baking in a desired amount of time.

. Graphical representation 30 illustrates the fat content by weight relationship of pepperoni at a constant temperature. As graphically illustrated, when the fat content of pepperoni is increased from the optimum value the number of breached seals on food product servings 34 also increases. However, with each decrease of a percentage in fat content of the pepperoni, there is a corresponding increase of the same percentage in the water content in order to maintain a predetermined volume of the pepperoni. Thus, as also shown in graphical representation 30, the number of breached seals on food product servings 34 increases as the fat content is decreased below the optimum value.

The optimum fat content of pepperoni occurs where the number of breached seals at 600° F. reaches its lowest point, as indicated in graphical representation 30, at a fat content of about forty-five percent. Thus, in the method of the present invention the fat content of pepperoni used as filling ingredient 18 is selected to be within a range of values substantially centered around forty-five percent. The range can thus be from about forty-two to forty-eight percent to substantially eliminate breached seals on food product servings 34. When the fat content is in this range, the water content of the pepperoni can be between about twenty-seven and thirty-three percent, thereby maintaining the constant volume of the pepperoni.

The meat used in pepperoni forming filling ingredients 18 can be skeletal muscle of beef and pork. It can have a protein content between about eighteen and twenty-one percent, a salt content between about 3.9 and 4.8 percent and a pH between 4.6 and 5.2. The moisture-to-protein ratio can be less than about 1.6 percent. The pepperoni also includes dextrose, spices, natural smoke flavoring, lactic acid, starter culture, oleoresin of paprika, dehydrated garlic, sodium nitrite, BHA, BHT and citric acid.

Graphical representation 40 illustrates the relationship between the fat content of cheese by weight used as filling ingredients 18 and the number of breached seals on food product servings 34. The number of breached seals on food product servings 34 increases as the fat content of the cheese and as the filling ingredients 18 increases above an optimum value. Furthermore, if the fat content of the cheese is lowered below the optimum value, the number of breached seals on food product servings 34 rises because the moisture content of the cheese begins to rise. The optimum value for the fat content of cheese selected according to this relationship is about forty-seven percent. A useful range has been determined to be between about forty-four to fifty percent. When the fat content of the cheese is in this range the moisture content can be between about fifty and fifty-six percent. In the preferred embodiment, the cheese can be three and one-half inch sticks of part skim frozen string cheese. It can have a pH of 5.3±0.15 and a salt content of 1.7% to 2.5%.

Figure 6:
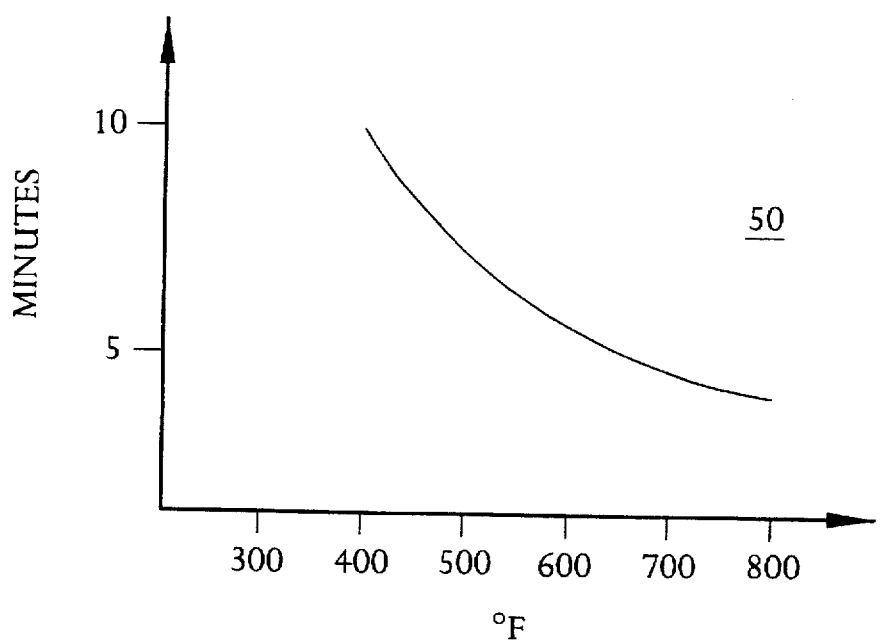
FIG. 6 shows a graphical representation of the relationship between the baking temperature of a food product serving and the baking time of the food product serving.

Referring now to FIG. 6, there is shown graphical representation 50. Graphical representation 50 illustrates the relationship between baking temperature and the amount of time required to bake food product servings 34. When a desired baking time is determined, the relationship of graphical representation 50 can be used to determine a required baking temperature. The optimum fat content of filling ingredients 18 for the determined temperature is then selected according to the relationship illustrated by graphical representations 30, 40. This can be done by preparing several batches of food product servings 34, each of the batches having a different fat content and baking the batches at the temperature determined from graphical representation 70. The incidence of breached seals is observed for each batch and the value of fat content providing the lowest incidence of breached seals is noted. Preferably, this method is used to permit the baking of food product servings 34 at substantially high temperatures, thus substantially eliminating breached seals while permitting food product servings 34 to be baked in a short period of time.

For a combination of two or more filling ingredients 18 the optimum fat content of the various ingredients 18 is determined in substantially the same manner as that described with respect to a single filling ingredient. Batches of food product servings 34 are prepared with the desired combination of ingredients 18 with different fat contents in each batch. Thus, the fat contents of one or more different ingredients 18 of the combination of ingredients 18 are varied between the different batches. The batches are baked at a determined temperature for the same amount of time, as previously described with respect to a single filling ingredient 18. The fat contents of the combined ingredients which substantially eliminate breaches are noted.

Considering the foregoing, the typical range of liquid content of filling ingredients 18 is believed to encompass a range from about forty-two to fifty percent with an optimum range of from about forty-five to forty-seven percent by weight fat. The contemplated products that can contain filling ingredients 18 selected in accordance with the method of the present invention can be any dough based food products.

When conventional fat-containing filling ingredients 18 are used without controlled fat content, the baking temperature can be limited to between about 350° F. and 450° F. in order to keep the breaking of seals to an acceptably low level. In this relatively low temperature range, food product servings similar to food product servings 34 require about ten minutes to bake as shown by graphical relationship 50.

Food product servings 34 of the present invention, however, can be baked at temperatures in excess of 600° F. while substantially eliminating breached seals. At a temperature of approximately 600° F. it can take between about five minutes and seven minutes to bake food product servings 34. Usually it takes about six minutes. In commercial fast food preparation environments, baking a food product in about six minutes rather than ten minutes provides a substantial advantage. Furthermore, it has been determined that it is possible to bake at temperatures of about 800° F. with substantially no breached seals when the fat content of the filling ingredient servings 18 is selected according to the method of the present invention. At temperatures of about 800° F. food product servings 34 can be baked in less than about four to five minutes.

In addition to limiting the amount of melted fat present to weaken the dough and breach the seals of food product servings 34, the method of the present invention provides a folded external edge 24 on one side of each food product serving 34 as previously described in order to decrease the number of breached seals. Because external edge 24 is formed by folding dough layer 14, rather than by pressing two layers of dough layer 14 together, it is less likely to become unsealed due to softening by liquids from filling ingredients 18. Thus, the number of seal breaches at high temperatures is further reduced in the method of the present invention.

It is to be understood that although the present invention has been described with reference to a preferred embodiment, various modifications, known to those skilled in the art, can be made to the structure and process steps presented therein. For example, the method of the present invention is not limited to determining an optimum fat content for pepperoni and cheese. It can be applied to any other filling ingredient having a selectable fat content by determining the relationship graphically represented by representations 30, 40 as it applies to the other filling ingredient.

We claim:

1. A method for preparing a dough food product having a filling ingredient with a selectable fat content and seal subject to seal breach for maintaining said filling ingredient within said food product comprising the steps of:

(a) disposing a layer of dough upon a surface;

(b) determining a relationship between said fat content and a rate of seal breach;

(c) selecting said fat content of said filling ingredient to substantially eliminate said seal breach during or after a baking process, in accordance with said determined relationship;

(d) disposing said filling ingredient having said selected fat content upon a first region of said layer of dough;

(e) folding a second region of said layer of dough over said first region to form a pocket enclosing said filling ingredient whereby said pocket has a folded external edge formed by said folded layer of dough and an unsealed external edge;

(f) forming a seal around said filling ingredient by sealingly joining said first and second regions to each other along said unsealed external edge; and (g) baking said food product.

2. The method for preparing a dough food product of claim 1, comprising the steps of disposing a plurality of servings of said filling ingredient upon said first region in a spaced apart relationship and individually enclosing said servings of said filling ingredient to form a plurality of subpockets including the step of sealingly joining said first and second regions to each other between said servings of said filling ingredient, prior to step (g).

3. The method for preparing a dough food product of claim 2, wherein said servings of said filling ingredient are arranged along a fold line of said layer of dough.

4. The method for preparing a dough food product of claim 1, comprising the step of baking said food product at a temperature in excess of about 600° F.

5. The method for preparing a dough food product of claim 4, comprising the step of baking said food product between about five minutes and seven minutes.

6. The method for preparing a dough food product of claim 1, wherein step (f) is preceded by the step of removing air from between said first and second regions prior to said forming of said seal.

7. The method for preparing a dough food product of claim 1, wherein said filling ingredient has a fat content from between about forty-two to about fifty percent.

8. The method for preparing a dough food product of claim 7, wherein said filling ingredient comprises pepperoni having a fat content of about forty-five percent.

9. The method for preparing a dough food product of claim 7, wherein said filling ingredient comprises cheese having a fat content of about forty-seven percent.

10. The method for preparing a dough food product of claim 1, wherein a plurality of filling ingredients is combined within said pocket and the fat content of the ingredients of said plurality of ingredients is selected to substantially eliminate said seal breach.

* * * * *